US009474028B2

(12) United States Patent
Kahn (10) Patent No.: US 9,474,028 B2
(45) Date of Patent: Oct. 18, 2016

(54) METHODS OF TRANSMITTING DATA USING AT LEAST ONE OF A PLURALITY OF WIRELESS ACCESSES, USER EQUIPMENT, AND NETWORK ELEMENT

(71) Applicant: Alcatel-Lucent USA, Inc., Murray Hill, NJ (US)

(72) Inventor: Colin Kahn, Morris Plains, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 108 days.

(21) Appl. No.: 14/321,045

(22) Filed: Jul. 1, 2014

(65) Prior Publication Data

US 2016/0007295 A1  Jan. 7, 2016

(51) Int. Cl.
| | | |
|---|---|---|
| *G08C 17/00* | (2006.01) | |
| *H04W 52/02* | (2009.01) | |
| *H04W 72/00* | (2009.01) | |
| *H04W 72/04* | (2009.01) | |
| *H04W 76/02* | (2009.01) | |
| *H04W 28/02* | (2009.01) | |
| *H04W 48/18* | (2009.01) | |

(52) U.S. Cl.
CPC ..... *H04W 52/0251* (2013.01); *H04W 28/0221* (2013.01); *H04W 48/18* (2013.01); *H04W 52/0258* (2013.01); *H04W 72/005* (2013.01); *H04W 72/048* (2013.01); *H04W 76/025* (2013.01)

(58) Field of Classification Search
CPC ......... H04W 52/0251; H04W 72/005; H04W 28/0221; H04W 72/048; H04W 76/025
See application file for complete search history.

(56) References Cited

U.S. PATENT DOCUMENTS

| | | | |
|---|---|---|---|
| 8,498,268 B1* | 7/2013 | Faccin | H04W 36/0011 370/331 |
| 8,594,617 B2* | 11/2013 | Papakostas | H04L 67/303 370/338 |
| 2009/0068969 A1 | 3/2009 | Lindoff et al. | |
| 2012/0020248 A1* | 1/2012 | Granlund | H04W 28/18 370/254 |
| 2013/0005333 A1* | 1/2013 | Chueh | H04W 36/24 455/426.1 |
| 2015/0106530 A1* | 4/2015 | Alanen | H04W 80/04 709/231 |

FOREIGN PATENT DOCUMENTS

| | | |
|---|---|---|
| EP | 2575398 A1 | 4/2013 |
| WO | WO-2011123841 A1 | 10/2011 |

OTHER PUBLICATIONS

Ford, et al., "TCP Extensions for Multipath Operation with Multiple Addresses," Internet Engineering Task Force, RFC 6824, Jan. 2013.
International Search Report and Written Opinion dated Oct. 1, 2015.

* cited by examiner

*Primary Examiner* — Yemane Mesfin
*Assistant Examiner* — Abdelillah Elmejjarmi
(74) *Attorney, Agent, or Firm* — Harness, Dickey & Pierce, P.L.C.

(57) ABSTRACT

At least one example embodiment discloses a method of transmitting data using at least one of a plurality of wireless accesses by a user equipment (UE), the plurality of wireless accesses including at least a first wireless access and a second wireless access. The method includes establishing connections with the first and second wireless accesses, respectively, determining a first power consumption to transmit a unit of data using the first wireless access, determining a second power consumption to transmit the unit of data using the second wireless access, allocating data to the first and second wireless accesses based on the determined first and second power consumptions and transmitting the data using at least one of the first and second wireless accesses based on the allocating.

17 Claims, 4 Drawing Sheets

METHODS OF TRANSMITTING DATA USING AT LEAST ONE OF A PLURALITY OF WIRELESS ACCESSES, USER EQUIPMENT, AND NETWORK ELEMENT

BACKGROUND

Managing battery life of a user equipment (UE) in the presence of multiple access options (e.g., LTE and Wifi) is generally performed manually. When a user notices that the battery level is getting low, the user turns off the Wifi access. In some cases, this is automated by an application which disables capabilities on the UE (like Wifi access) when the battery level falls below a threshold.

A Multi Path TCP (MPTCP) protocol, as specified by the Internet Engineering Task Force (IETF) (RFC6824), allows for reverse multiplexing of flows to exploit multiple IP paths between a sender and a receiver. The entire contents of RFC 6824 ("the MPTCP RFC") are hereby incorporated by reference.

MPTCP sets up multiple TCP sub-flows (e.g., LTE and Wifi) for a single TCP Socket connection with an application. MPTCP divides packets between the available sub-flows according to end-to-end bandwidth as sensed by a TCP congestion control/avoidance. Hence, fewer or more packets may be sent on one of the sub-flows based on the end-to-end bandwidth sensed between the UE and an MPTCP compatible server in the network. Sub-flows may be added or dropped as access options come and go, allowing for seamless mobility from the perspective of the application and user.

$3^{rd}$ Generation Partnership Project (3GPP) also defines an access selection control for non-3GPP access such as Wifi versus 3GPP Access. 3GPP has specified a policy based decision process based on an Access Network Discovery and Selection (ANDSF) function. ANDSF allows the mobile operator to specify Inter-System Routing Policies (ISRPs) that indicate whether a flow or service should be routed over a Wifi or 3GPP access when the UE is simultaneously connected to both.

SUMMARY

The use of TCP congestion control by MPTCP sub-flows does not take into account battery usage by the device for the two accesses. Moreover, the 3GPP access selection control does not allow for per-packet multiplexing between Wifi and 3GPP and does not specify a mechanism where battery consumption can be used as a criterion for selecting an access option on a per-flow or per-service basis.

To resolve these issues, at least one example embodiment discloses a method of transmitting data using at least one of a plurality of wireless accesses by a user equipment (UE), the plurality of wireless accesses including at least a first wireless access and a second wireless access. The method includes establishing connections with the first and second wireless accesses, respectively, determining a first power consumption to transmit a unit of data using the first wireless access, determining a second power consumption to transmit the unit of data using the second wireless access, allocating data to the first and second wireless accesses based on the determined first and second power consumptions and transmitting the data using at least one of the first and second wireless accesses based on the allocating.

In an example embodiment, the establishing includes obtaining first and second Internet Protocol (IP) addresses for the first and second wireless accesses, respectively.

In an example embodiment, the first and second IP addresses are different.

In an example embodiment, the first and second wireless accesses are associated with different port numbers.

In an example embodiment, the establishing establishes first and second Transfer Control Protocol (TCP) sub-flows for the first and second wireless accesses, respectively.

In an example embodiment, the allocating allocates the data based on a function of the first power consumption and the second power consumption.

In an example embodiment, the allocating allocates the data based on a ratio of the first power consumption to the second power consumption.

In an example embodiment, the allocating includes determining a first supported data rate for the first wireless access and determining a second supported data rate for the second wireless access, the allocating based on the function of the first power consumption and the second power consumption and the first and second supported data rates.

In an example embodiment, the transmitting includes adjusting at least one of a first transmission data rate for the first wireless access and a second transmission data rate for the second wireless access, the transmitting transmits the data using the at least one adjusted first transmission data rate and second transmission data rate.

In an example embodiment, the transmitting includes determining if a sum of the first and second supported data rates is below a threshold and transmitting data allocated to the first wireless access using a first transmission data rate, the first transmission data rate being the first supported data rate if the sum is below the threshold, and transmitting data allocated to the second wireless access using a second transmission data rate, the second transmission data rate being the second supported data rate if the sum is below the threshold.

In an example embodiment, the allocating includes determining if an output of the function exceeds a threshold, the transmitting being based on whether the function output exceeds the threshold.

In an example embodiment, the allocating includes disabling the first wireless access if the function output exceeds the threshold and allocating all the data to the second wireless access.

In an example embodiment, the transmitting transmits the data using the first and second wireless accesses if the function output is below the threshold.

At least one example embodiment discloses a method of controlling transmissions using a plurality of wireless accesses, the plurality of wireless accesses including at least a first wireless access and a second wireless access. The method includes transmitting a signal to a user equipment (UE), the UE being configured to establish connections with the first and second wireless accesses, respectively, the signal instructing the UE to determine a first consumption power to transmit a unit of data on the first wireless access, determine a second consumption power to transmit the unit of data on the second wireless access, allocate data to the first and second wireless accesses based on the determined first and second powers and transmit the data using at least one of the first and second wireless accesses based on the allocating.

At least one example embodiment discloses a method of controlling transmissions using a plurality of wireless accesses, the plurality of wireless accesses including at least a first wireless access and a second wireless access. The method includes transmitting a signal to a user equipment (UE), the UE being configured to establish connections with the first and second wireless accesses, respectively, the signal permitting the UE to allocate data to the first and second wireless accesses based on a first consumption power to transmit a unit of data on the first wireless access and a second consumption power to transmit the unit of data on the second wireless access, and transmit the data using at least one of the first and second wireless accesses based on the allocating.

At least one example embodiment discloses a user equipment (UE) including a power source, a processor configured to establish connections with at least first and second wireless accesses, respectively, determine a first power consumption from the power source to transmit a unit of data using the first wireless access, determine a second power consumption from the power source to transmit the unit of data using the second wireless access, allocate data to the first and second wireless accesses based on the determined first and second power consumptions and a transmitter configured to transmit the data using at least one of the first and second wireless accesses based on the allocating.

In an example embodiment, the processor is configured to establish includes obtaining first and second Internet Protocol (IP) addresses for the first and second wireless accesses, respectively.

In an example embodiment, the first and second IP addresses are different.

In an example embodiment, the first and second wireless accesses are associated with different port numbers.

In an example embodiment, the processor is configured to establish establishes first and second Transfer Control Protocol (TCP) sub-flows for the first and second wireless accesses, respectively.

In an example embodiment, the processor is configured to allocate the data based on a function of the first power consumption and the second power consumption.

In an example embodiment, the processor is configured to allocate the data based on a ratio of the first power consumption to the second power consumption.

In an example embodiment, the processor is configured to determine a first supported data rate for the first wireless access, and determine a second supported data rate for the second wireless access, the processor is configured to allocate the data based on the function of the first power consumption and the second power consumption and the first and second supported data rates.

In an example embodiment, the transmitter is configured to adjust at least one of a first transmission data rate for the first wireless access and a second transmission data rate for the second wireless access, the transmitting transmits the data using the at least one adjusted first transmission data rate and second transmission data rate.

In an example embodiment, the processor is configured to determine if a sum of the first and second supported data rates is below a threshold and the transmitter is configured to transmit data allocated to the first wireless access using a first transmission data rate, the first transmission data rate being the first supported data rate if the sum is below the threshold, and transmit data allocated to the second wireless access using a second transmission data rate, the second transmission data rate being the second supported data rate if the sum is below the threshold.

In an example embodiment, the processor is configured to determine if an output of the function exceeds a threshold and the transmitter is configured to transmit the data based on whether the function output exceeds the threshold.

In an example embodiment, the processor is configured to disable the first wireless access if the function output exceeds the threshold and allocate all the data to the second wireless access.

In an example embodiment, the transmitter is configured to transmit the data using the first and second wireless accesses if the function output is below the threshold.

At least one example embodiment discloses a network element configured to control transmissions using a plurality of wireless accesses, the plurality of wireless accesses including at least a first wireless access and a second wireless access. The network element includes a transmitter configured to transmit a signal to a user equipment (UE), the UE being configured to establish connections with the first and second wireless accesses, respectively, the signal instructing the UE to determine a first consumption power to transmit a unit of data on the first wireless access, determine a second consumption power to transmit the unit of data on the second wireless access, allocate data to the first and second wireless accesses based on the determined first and second powers, and transmit the data using at least one of the first and second wireless accesses based on the allocating.

At least one example embodiment discloses a network element configured to control transmissions using a plurality of wireless accesses, the plurality of wireless accesses including at least a first wireless access and a second wireless access. The network element includes a transmitter configured to transmit a signal to a user equipment (UE), the UE being configured to establish connections with the first and second wireless accesses, respectively, the signal permitting the UE to allocate data to the first and second wireless accesses based on a first consumption power to transmit a unit of data on the first wireless access and a second consumption power to transmit the unit of data on the second wireless access, and transmit the data using at least one of the first and second wireless accesses based on the allocating.

BRIEF DESCRIPTION OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

Although current network architectures may consider a distinction between mobile/user devices and access points/cell sites, the example embodiments described hereafter may also generally be applicable to architectures where that distinction is not so clear, such as ad hoc and/or mesh network architectures, for example.

A wireless access provides a path from a mobile device to a corresponding node with which it desires to communicate. In at least some example embodiments, two wireless accesses may or may not use the same access technology. For example, two wireless accesses may both be Wifi or one may be Wifi and the other may be a 3GPP access.

At least some example embodiments disclose methods and systems to increase a battery life of a UE when using multiple access options.

The use of TCP congestion control/avoidance by MPTCP sub-flows does not take into account battery usage by the device for the two accesses.

Moreover, the 3GPP access selection control does not allow for per-packet multiplexing between Wifi and 3GPP, and does not specify a mechanism whereby battery consumption can be used as a criterion for selecting an access option on a per-flow or per-service basis.

Building on MPTCP, at least some example embodiments provide a mechanism for using battery consumption as a criterion for selecting the access on which to send a packet when the UE has multiple simultaneous connections. Furthermore, at least some example embodiments provide a criterion that can be used by the UE to decide when to drop an access based on battery efficiency.

Figure 1:
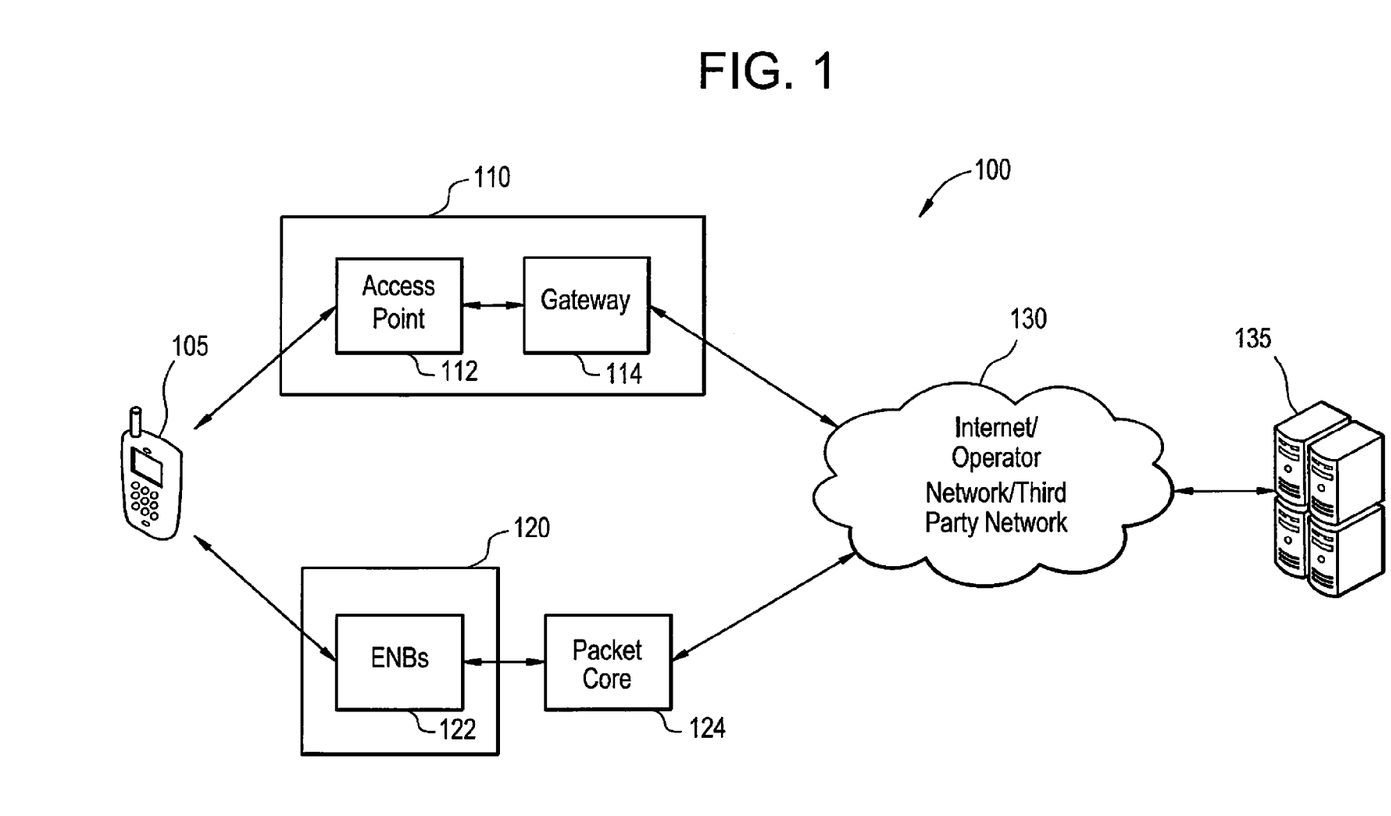
FIG. 1 illustrates a wireless communication system according to an example embodiment.

FIG. 1 illustrates a communication system according to an example embodiment.

The communication system 100 includes first and second wireless accesses 110 and 120 configured to communicate with a user equipment (UE) 105. The first and second wireless accesses 110 and 120 follow different wireless accesses.

The first wireless access 110 may be a wireless local area network and follow, for example, a Wifi protocol, WiMax, 3GPP, 3GPP2 (CDMA), Bluetooth, near field communication (NFC) of 5G. However, the first wireless access 110 is not limited thereto.

The first wireless access 110 includes an access point 112. The access point 112 communicates with a gateway 114, such as a WLAN gateway. The first wireless access 110 may be configured to provide a connection to the Internet, an operator network, or a $3^{rd}$ party network 130 for various network elements through the gateway 114. In various embodiments, the first wireless access 110 may be a Wide Area Network (WAN) or other like network that covers a broad area, such as a personal area network (PAN), local area network (LAN), campus area network (CAN), metropolitan area network (MAN), and the like.

The access point 112 and the gateway 114 may include one or more processors and an associated memory operating together to achieve their respective functionality.

The second wireless access 120 may follow, for example, a Long Term Evolution (LTE) protocol. It should be understood that example embodiments are not limited to LTE and that the second wireless access 120 may be another type of 3GPP network such as 5G.

The second wireless access 120 includes at least one eNB 122 configured to access the Internet, the operator network, or the 3rd party network 130 through a packet core 124. The packet core 124 may include a gateway and a mobility management entity (MME). In an example embodiment, the gateway in the packet core 124 may be the gateway 114. Each eNB 122 may have a coverage area which may include a single cell or a plurality of cells. Moreover, the eNB 122 may communicate with the UE 105.

The eNB 122 and the gateway and MME of the packet core 124 may include one or more processors and an associated memory operating together to achieve their respective functionality.

The packet core 124 may include one or more mobility management entities (MME), a Home eNB Gateway, a serving gateway (S-GW), a packet data network gateway (P-GW), a security gateway and/or one or more operations, administration and management (OAM) nodes (not shown). For the convenience of illustration, the packet core 124 is illustrated as a single node, however, it should be understood that the packet core 124 may be represented as separate nodes (e.g., MME for control plane and GW for the other bearer).

The MME of the packet core 124 communicates with the eNB 122 over an Si interface.

The second wireless access 120 may be configured to provide a connection to the Internet, the operator network, or the $3^{rd}$ party network 130 for various network elements through the packet core 124.

Any one of the access point 112, gateway 114, eNB 122 may be referred to as a network element.

The first and second wireless accesses 110 and 120 are connected to an application server 135 via the Internet, the operator network, or the $3^{rd}$ party network 130. The application server 135 may be any type of server that is compatible with MPTCP and includes a processor, memory, and software application. Although only one application server 135 is illustrated in FIG. 1, example embodiments may encompass any number of application servers connected to the first and second wireless accesses 110 and 120. Furthermore the application server 135 may be a delivery appliance from a Content Delivery Network, or an MPTCP Proxy Server terminating the MPTCP protocol in the network.

The system 100 may also include other components that are well known for the transfer of data from the first and second wireless accesses 110 and 120 to an internet-based application server 135 (or vice versa) such as an application programming interface (API) and an application exposure framework (AES), for example. The application server 135 transmits requests for information and/or response messages to the first and second wireless accesses 110 and 120 according to any type of standard response-request protocol used to transfer data in an internet-based system such as HTTP or REST exposed through the AES.

It should be noted that the first and second wireless accesses 110 and 120 are not limited to the features shown therein. These features are shown for explanation of example embodiments. For example, it should be understood that the second access 120 may include common features such as a home subscriber server (HSS) and an Off-line charging System (OFCS).

The UE 105 may be in wireless communication with at least one of the first access 110 and second access 120 via a physical or logical interface with an associated driver. The UE 105 is an MPTCP capable UE. Therefore, the UE 105 may be simultaneously connected to both the first and second accesses 110 and 120. The UE 105 may be assigned separate IP addresses for each the first and second accesses 110 and 120 or different ports. In the instance where the UE uses different ports, but uses a single IP address, the gateway 114 connects to the packet core 124 and there is a common gateway (e.g., the gateway 114). The UE is capable of sending packets over communication paths to the first access 110 and the second access 120.

The UE 105 includes a power source (e.g., a battery) and a transmitter and is configured to establish connections with at least the first and second wireless accesses 110 and 120, respectively, determine a first power consumption from the power source to transmit a unit of data using the first wireless access, determine a second power consumption from the power source to transmit the unit of data using the second wireless access, allocate data to the first and second wireless accesses based on the determined first and second power consumptions. The UE 105 is configured to transmit the data using at least one of the first and second wireless accesses based on the allocating.

Figure 2:
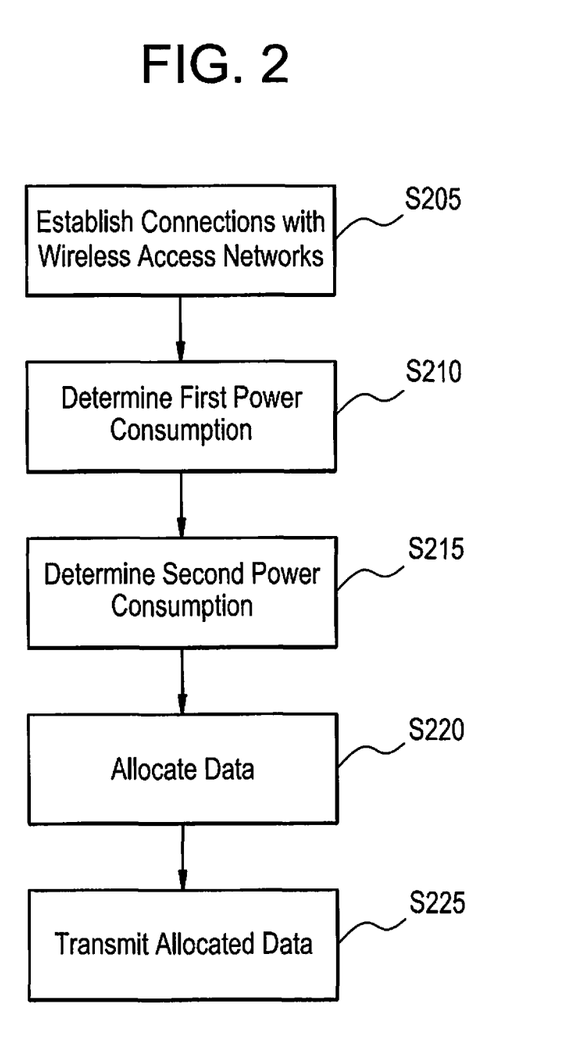
FIG. 2 illustrates a method of transmitting data using at least one of a plurality of wireless accesses by a UE, according to an example embodiment.

FIG. 2 illustrates a method of transmitting data using at least one of a plurality of wireless accesses by a UE 105, according to an example embodiment. The method of FIG. 2 may be performed by the UE 105.

At S205, the UE 105 establishes communication paths with the first and second accesses 110 and 120. The communication paths may include TCP sub-flows for the first and second wireless accesses, respectively. To establish communications with the first and second accesses 110 and 120 simultaneously, the UE 105 obtains different IP addresses or uses different port numbers associated with the first and second accesses 110 and 120.

At S210, the UE 105 determines a first power consumption Pb-Wifi to transmit a unit of data using the first wireless access 110. At S215, the UE 105 determines a second power consumption Pb-LTE to transmit a unit of data using the second wireless access 120. The first and second power consumptions Pb-Wifi and Pb-LTE are the powers consumed by the power source (e.g., the battery), which are different than a transmit power.

A unit of data may be a bit. However, example embodiments are not limited thereto.

The UE 105 may determine the first and second power consumptions Pb-Wifi and Pb-LTE based on an average measurement of consumed power during a prior transmission interval, for example based on a radio frequency (RF) transmit power used by the LTE and Wifi transceivers, or from monitoring the power drawn from the battery during the transmission intervals. Furthermore, historical information, for example information indicating the consumed battery power under past similar RF conditions and network loading may be used in combination with zero or more measured battery and RF transmission metrics to calculate Pb-Wifi and Pb-LTE. Furthermore, the first power consumption may include an overhead associated with keeping a Wifi radio "on".

As should be understood, the first and second power consumptions Pb-Wifi and Pb-LTE increase/decrease according to the proximity of the UE 105 to the access point 112 and the eNB 122 and the level of congestion on the accesses 110 and 120.

S220, the UE 105 allocates data to be transmitted based on the determined first and second power consumptions Pb-Wifi and Pb-LTE. More specifically, the UE 105 determines a first supported data rate for the first wireless access 110 and a second supported data rate for the second wireless access 120 based on the TCP congestion control/avoidance as described in the MPTCP RFC. The UE 105 uses the first and second power consumptions Pb-Wifi and Pb-LTE, together with the rates calculated based on the TCP congestion control/avoidance to generate a weighted first supported data rate $R_{Wifi}$ and a weighted second supported data rate $R_{LTE}$.

For example, if the TCP congestion control indicates that the first and second accesses 110 and 120 can each support a data rate R1 and R2, respectively, but the first power consumption Pb-Wifi is two times the second power consumption Pb-LTE, the UE 105 generates the weighted first supported data rate $R_{Wifi}$ as:

$$R_{Wifi} = f1(R1, R2, Pb\text{-LTE}, Pb\text{-Wifi})$$

and the weighted second supported data rate $R_{LTE}$ as:

$$R_{LTE} = f2(R1, R2, Pb\text{-LTE}, Pb\text{-Wifi})$$

where the functions f1( ) and f2( ) incorporate the difference between the first power consumption Pb-Wifi and the second power consumption Pb-LTE such that $R_{Wifi} < R_{LTE}$.

In an example embodiment, the UE 105 determines that $$R_{Wifi} = R1 * Pb\text{-LTE}/Pb\text{-Wifi} = \tfrac{1}{2}R1$$

if the total data rate $R_{Wifi} + R_{LTE}$ is greater than a threshold T1 determined from the needs of an application, where the first power consumption Pb-Wifi is two times the second power consumption Pb-LTE.

For example, an HTTP adaptive streaming (HAS) video application may require a minimum data rate of 200 kbps corresponding to the lowest video codec rate, and T1=200 kbps. In the present case, if R1=R2, then for every packet sent by the UE 105 on the first access 110, two would be sent by the UE 105 on the second access 120, at S225.

If the UE 105 determines that the total data rate $R_{Wifi} + R_{LTE}$ is less than or equal to the threshold T1, the UE 105 uses the first supported data rate for the first wireless access 110 and the second supported data rate for the second wireless access 120 based on the TCP congestion control.

The UE 105 may also use a threshold T2 for the ratio of the first power consumption Pb-Wifi to the second power consumption Pb-LTE. For example, if the ratio exceeds the threshold T2, the UE 105 may disable communication with the first access 110, using only LTE access until such time as the power efficiency on Wifi access improves.

By using the determined first and second power consumptions, battery power use is added as a criterion for using an access rather than having a scheduling mechanism based solely on throughput.

It should be understood that a network element, such as an eNB, may transmit a signal to the UE 105 that enables/permits the UE 105 to perform the method shown in FIG. 2.

Figure 3:
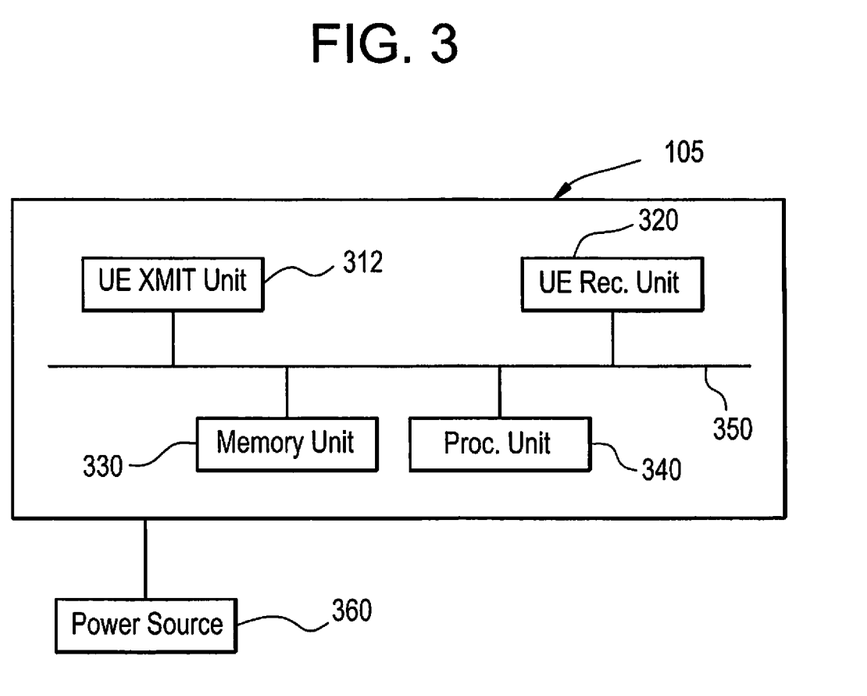
FIG. 3 illustrates an example embodiment of a user equipment shown in FIG. 1.

FIG. 3 illustrates an example embodiment of the UE 105. It should be also understood that the UE 105 may include features not shown in FIG. 3 and should not be limited to those features that are shown.

The UE 105 is configured to determine channel conditions, speed and location information.

The UE 105 may include, for example, a transmitting unit 312, a UE receiving unit 320, a memory unit 330, a processing unit 340, a power source 360 and a data bus 350. The power source 360 may be a battery and provides power to the transmitting unit 312, the receiving unit 320, the memory unit 330, the processing unit 340 and the data bus 350.

The transmitting unit 312, receiving unit 320, memory unit 330, and processing unit 340 may send data to and/or receive data from one another using the data bus 350. The transmitting unit 312 is a device that includes hardware and any necessary software for transmitting wireless signals on the uplink (reverse link) including, for example, data signals, control signals, and signal strength/quality information via one or more wireless connections to other wireless devices (e.g., base stations). The transmitting unit 312 includes processing paths for transmitting signals to at least the first and second wireless accesses.

The receiving unit 320 is a device that includes hardware and any necessary software for receiving wireless signals on the downlink (forward link) channel including, for example, data signals, control signals, and signal strength/quality information via one or more wireless connections from other wireless devices (e.g., base stations). The receiving unit 320 includes processing paths for receiving signals from at least the first and second wireless accesses.

While illustrated as separate units, it should be understood that the transmitting unit 312 and the receiving unit 320 may be formed as a single unit transceiver.

The memory unit 330 may be any storage medium capable of storing data including magnetic storage, flash storage, etc.

The processing unit 340 may be any device capable of processing data including, for example, a microprocessor configured to carry out specific operations based on input data, or capable of executing instructions included in computer readable code. For example, the processing unit 340 is configured to establish connections with at least first and second wireless accesses, respectively, determine a first power consumption from the power source to transmit a unit of data using the first wireless access, determine a second power consumption from the power source to transmit the unit of data using the second wireless access, allocate data to the first and second wireless accesses based on the determined first and second power consumptions and a transmitter configured to transmit the data using at least one of the first and second wireless accesses based on the allocating.

Figure 4:
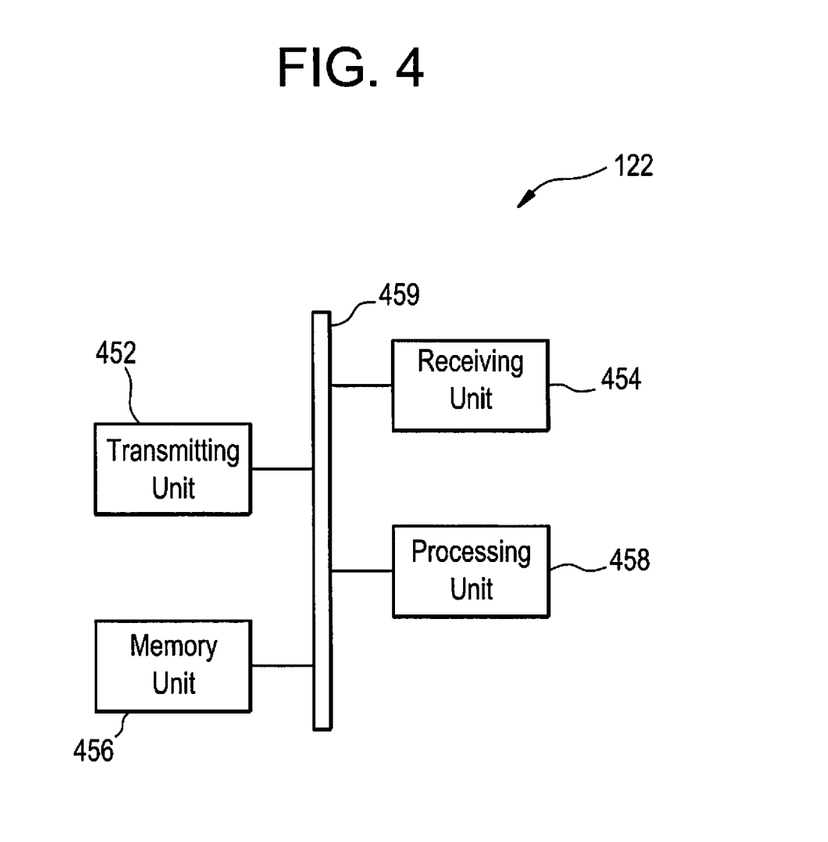
FIG. 4 illustrates an example embodiment of a network element shown in FIG. 1.

FIG. 4 illustrates an example embodiment of a network element such as the eNB 122. It should be also understood that the eNB 122 may include features not shown in FIG. 4 and should not be limited to those features that are shown.

Still referring to FIG. 4, the eNB 122 may include, for example, a data bus 459, a transmitting unit 452, a receiving unit 454, a memory unit 456, and a processing unit 458.

The transmitting unit 452, receiving unit 454, memory unit 456, and processing unit 458 may send data to and/or receive data from one another using the data bus 459. The transmitting unit 452 is a device that includes hardware and any necessary software for transmitting wireless signals including, for example, data signals, control signals, and signal strength/quality information via one or more wireless connections to other network elements in the wireless communications network 100.

The transmitting unit 452 is configured to transmit a signal to a user equipment (UE), the UE being configured to establish connections with the first and second wireless accesses, respectively, the signal instructing the UE to determine a first consumption power to transmit a unit of data on the first wireless access, determine a second consumption power to transmit the unit of data on the second wireless access, allocate data to the first and second wireless accesses based on the determined first and second powers, and transmit the data using at least one of the first and second wireless accesses based on the allocating.

The receiving unit 454 is a device that includes hardware and any necessary software for receiving wireless signals including, for example, data signals, control signals, and signal strength/quality information via one or more wireless connections to other network elements in the network 100.

While illustrated as separate units, it should be understood that the transmitting unit 452 and the receiving unit 454 may be formed as a single unit transceiver.

The memory unit 456 may be any device capable of storing data including magnetic storage, flash storage, etc. The memory unit 456 is used for data and controlling signal buffering and storing for supporting pre-scheduling and the scheduled data transmissions and re-transmissions.

The processing unit 458 may be any device capable of processing data including, for example, a microprocessor configured to carry out specific operations based on input data, or capable of executing instructions included in computer readable code.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of transmitting data using at least one of a plurality of wireless accesses by a user equipment (UE), the plurality of wireless accesses including at least a first wireless access and a second wireless access, the method comprising:
    establishing connections with the first and second wireless accesses, respectively;
    determining a first power consumption to transmit a unit of data using the first wireless access;
    determining a second power consumption to transmit the unit of data using the second wireless access;
    allocating data to the first and second wireless accesses based on the determined first and second power consumptions, the allocating including,
        determining a first supported data rate for the first wireless access;
        determining a second supported data rate for the second wireless access;
        weighting the first supported data rate and the second supported data rate based on the first power consumption and the second power consumption, and
        allocating the data in accordance with the weighted first supported data rate and the weighted second supported data rate; and
    transmitting the data using at least one of the first and second wireless accesses based on the allocating.

2. The method of claim 1, wherein the establishing includes obtaining first and second Internet Protocol (IP) addresses for the first and second wireless accesses, respectively.

3. The method of claim 2, wherein the first and second IP addresses are different.

4. The method of claim 2, wherein the first and second wireless accesses are associated with different port numbers.

5. The method of claim 1, wherein the establishing establishes first and second Transfer Control Protocol (TCP) sub-flows for the first and second wireless accesses, respectively.

6. The method of claim 1, wherein the allocating allocates the data based on a function of the first power consumption and the second power consumption.

7. The method of claim 6, wherein the allocating allocates the data based on a ratio of the first power consumption to the second power consumption.

8. The method of claim 6, wherein the allocating allocates the data based on the function of the first power consumption and the second power consumption and the first and second supported data rates.

9. The method of claim 1, wherein the transmitting includes,
    determining if a sum of the weighted first and second supported data rates is below a threshold; and
    transmitting data allocated to the first wireless access using a first transmission data rate, the first transmission data rate being the first supported data rate if the sum is below the threshold, and transmitting data allocated to the second wireless access using a second transmission data rate, the second transmission data rate being the second supported data rate if the sum is below the threshold.

10. The method of claim 6, wherein the allocating includes, determining if a sum of the weighted first and second supported data rates exceeds a threshold, the transmitting being based on whether the sum exceeds the threshold.

11. The method of claim 10, wherein the allocating includes, disabling the first wireless access if the sum exceeds the threshold; and allocating all the data to the second wireless access.

12. The method of claim 10, wherein the transmitting transmits the data using the first and second wireless accesses if the sum is below the threshold.

13. A user equipment (UE) comprising:

a power source;

a processor configured to, establish connections with at least first and second wireless accesses, respectively, determine a first power consumption from the power source to transmit a unit of data using the first wireless access, determine a second power consumption from the power source to transmit the unit of data using the second wireless access, allocate data to the first and second wireless accesses based on the determined first and second power consumptions, the allocation of data to the first and second wireless accesses includes, determine a first supported data rate for the first wireless access, determine a second supported data rate for the second wireless access, weight the first supported data rate and the second supported data rate based on the first power consumption and the second power consumption, and allocate the data in accordance with the weighted first supported data rate and the weighted second supported data rate; and a transmitter configured to transmit the data using at least one of the first and second wireless accesses based on the allocating.

14. The UE of claim 13, wherein the processor is configured to allocate the data based on a function of the first power consumption and the second power consumption.

15. The UE of claim 14, wherein the processor is configured to allocate the data based on a ratio of the first power consumption to the second power consumption.

16. The UE of claim 14, wherein the processor is configured to, allocate the data based on the function of the first power consumption and the second power consumption and the first and second supported data rates.

17. The UE of claim 13, wherein the processor is configured to determine if a sum of the weighted first and second supported data rates is below a threshold, and the transmitter is configured to transmit data allocated to the first wireless access using a first transmission data rate, the first transmission data rate being the first supported data rate if the sum is below the threshold, and transmit data allocated to the second wireless access using a second transmission data rate, the second transmission data rate being the second supported data rate if the sum is below the threshold.

* * * * *